(12) United States Patent
Ross-Martin

(10) Patent No.: US 8,433,467 B2
(45) Date of Patent: Apr. 30, 2013

(54) VEHICLE GUIDANCE SYSTEM

(75) Inventor: Torquil Ross-Martin, Somerset (GB)

(73) Assignee: ULTra Global Limited, Bristol (GB)

( * ) Notice: Subject to any disclaimer, the term of this patent is extended or adjusted under 35 U.S.C. 154(b) by 327 days.

(21) Appl. No.: 12/596,590

(22) PCT Filed: Apr. 10, 2008

(86) PCT No.: PCT/GB2008/001255
§ 371 (c)(1),
(2), (4) Date: Feb. 11, 2010

(87) PCT Pub. No.: WO2008/129236
PCT Pub. Date: Oct. 30, 2008

(65) Prior Publication Data
US 2010/0145550 A1 Jun. 10, 2010

(30) Foreign Application Priority Data

Apr. 20, 2007 (GB) .................................. 0707682.1

(51) Int. Cl.
*G05D 1/02* (2006.01)
*G01S 17/00* (2006.01)
*G01S 17/93* (2006.01)
(52) U.S. Cl.
USPC .................................. 701/23; 701/24; 701/26
(58) Field of Classification Search .................... 701/23, 701/24, 26; 318/587; 180/647, 168, 169
See application file for complete search history.

(56) References Cited

U.S. PATENT DOCUMENTS

| | | | | |
|---|---|---|---|---|
| 4,069,888 A | * | 1/1978 | Wolters et al. | 180/169 |
| 4,630,109 A | * | 12/1986 | Barton | 348/119 |
| 4,716,530 A | * | 12/1987 | Ogawa et al. | 701/23 |
| 4,918,362 A | | 4/1990 | Christensen et al. | |
| 5,000,279 A | | 3/1991 | Kondo et al. | |
| 5,172,315 A | | 12/1992 | Asanuma et al. | |
| 5,219,036 A | | 6/1993 | Schwager et al. | |
| 5,355,511 A | * | 10/1994 | Hatano et al. | 455/11.1 |
| 5,390,118 A | * | 2/1995 | Margolis et al. | 701/23 |
| 5,474,267 A | * | 12/1995 | Kubota et al. | 246/182 B |
| 5,778,796 A | | 7/1998 | Kim | |
| 5,913,376 A | | 6/1999 | Takei | |

(Continued)

FOREIGN PATENT DOCUMENTS

| | | |
|---|---|---|
| EP | 1350707 A2 | 10/2003 |
| GB | 2384223 A | 7/2003 |
| WO | WO-2006037445 A1 | 4/2006 |

OTHER PUBLICATIONS

International Search Report of Application PCT/GB2008/001255 filed Apr. 10, 2008.

*Primary Examiner* — Joseph Rocca
(74) *Attorney, Agent, or Firm* — Honigman Miller Schwartz and Cohn LLP

(57) ABSTRACT

A vehicle guidance system for directing a vehicle along a predetermined path comprises an onboard computer, a number of distance sensors and a steering system controllable by the computer. The predetermined path is stored in a memory of the computer and, in operation, the steering system is controlled to follow the predetermined path. The sensors are adapted to measure the distance, laterally of the vehicle travel direction, between the sensors and curbs provided along the predetermined path, and the computer is adapted to control the steering system to correct any lateral deviation from the predetermined path as detected by the sensors.

15 Claims, 2 Drawing Sheets

U.S. PATENT DOCUMENTS

| | | |
|---|---|---|
| 5,951,610 A | 9/1999 | Nagai |
| 6,064,925 A * | 5/2000 | Kobayashi et al. ............. 701/23 |
| 6,349,249 B1 * | 2/2002 | Cunningham ................. 701/28 |
| 7,014,003 B2 * | 3/2006 | Polak ........................... 180/169 |
| 2001/0044577 A1 | 11/2001 | Braun et al. |
| 2003/0233177 A1 * | 12/2003 | Johnson et al. ................. 701/23 |
| 2004/0114631 A1 * | 6/2004 | Aiken et al. .................. 370/503 |
| 2007/0030347 A1 * | 2/2007 | Jecker et al. .................. 348/135 |
| 2008/0071429 A1 * | 3/2008 | Kraimer et al. ................... 701/2 |

* cited by examiner

VEHICLE GUIDANCE SYSTEM

BACKGROUND OF THE INVENTION

This invention relates to a vehicle guidance system, and particularly but not exclusively to a vehicle guidance system for an unmanned personal rapid transit (PRT) vehicle.

In general, a personal rapid transport (PRT) system comprises a dedicated track on which individual vehicles travel between stations. Each vehicle contains only one passenger or group of passengers, and the vehicle travels continuously between the starting point and the destination without stopping at any intermediate stations. PRT systems thus provide a compromise between a conventional mass transport system such as buses, trains and metro systems, and individual passenger cars.

It is known to provide an unmanned vehicle or driverless vehicle suitable for travelling on rails, such as monorail or dual rails used in conventional railway construction. The railway track is usually part of a network of track, and to travel from one destination to another, points at the junctions between tracks have to be arranged accordingly. The vehicles follow the tracks without any on-board steering control and cannot make a journey to a destination in the network, without the points being arranged specifically for that journey. An example of such a system is disclosed in U.S. Pat. No. 5,778,796.

It is also known to provide an unmanned self-steering vehicle with sensors that follow a track, e.g. a foil, rail or marked surface set into or resting on the ground. Typically, the vehicle slavishly follows the track, and is limited to the route specifically provided for by the track.

According to the present invention there is provided a vehicle guidance system for directing a vehicle along a predetermined path along which extends an elevated structure having a reference surface, the system comprising a control means, a memory for storing the predetermined path, and a sensor which is adapted to measure the distance, laterally of the vehicle travel direction, between the sensor and the reference surface provided along the predetermined path, the control means being adapted to control a steering system of the vehicle to correct any lateral deviation of the vehicle from the predetermined path in response to an output from the sensor.

It is an advantage of the invention that the memory can store a number of predetermined paths, one of which can be selected by a user travelling in the vehicle.

It is a further advantage of the invention that the vehicle guidance system can be used in a vehicle for use in any travel network, by storing the predetermined paths specific to the desired network in the memory.

The term "steering system" is intended to include any type of mechanism, device or control device, which is capable of steering or directing a vehicle along a path in response to an output or control signal from a control means, including a computer. In a preferred embodiment, the vehicle is a wheeled vehicle and the steering system comprises steerable wheels and a steering mechanism that controls the steering direction of the steerable wheels.

The sensor may be one of a plurality of sensors. For example, four sensors may be provided, each positioned substantially at or near a corner of the vehicle, and directed laterally of the longitudinal axis of the vehicle. Preferably two sensors are provided on each side of the vehicle, which are spaced apart sufficiently to detect any angular change in the position of the central axis of the vehicle relative to a substantially straight reference surface.

The or each sensor may be a non-contact sensor, such as an ultrasonic, laser, radar or any other suitable sensor for sensing distance.

The vehicle guidance system may comprise a trackway on which the vehicle runs. The trackway may be bounded by curbs laid on each side of the trackway. The curbs may provide the reference surface, which is sensed by the sensors. The term "trackway" is intended to include any track, roadway or surface, dedicated or otherwise, over which the vehicle may run. In a preferred embodiment, the system comprises a trackway having a generally flat running surface for the vehicle, bounded laterally by curbs or other elevated structures. The trackway may for example, be constructed in accordance with British Patent Specification 2384223.

The trackway may be banked or super-elevated at bends in the trackway, determined by the intended operating speed of the vehicles and the layout of junctions.

The sensors preferably detect the distance, laterally of the vehicle travel direction, between the sensors and the curb sides or trackway edges.

The or each sensor may operate continuously to sense the distance from the sensor to the curb side, enabling the computer to continuously correct for any lateral deviation from the predetermined path. The term "continuously" is intended to include both continuous analogue operation of the or each sensor as well as digital operation at a relatively high sampling rate.

The curbs may be interrupted at junctions, enabling the vehicle to move between trackways.

The difference or error between the actual position of the vehicle as detected by the sensors, and the ideal position of the vehicle as determined by the predetermined path may be used to correct both the lateral deviation of the vehicle from the predetermined path and also the vehicle alignment with predetermined path.

Reference markers may be positioned at intervals along the predetermined path. The reference markers may be reflectivity changes in protuberances or undercuts provided in the curb sides, which may be identifiable by the sensors as a step discontinuity in the distance signal output by them. The control means may compare the actual position of the vehicle on the predetermined path, as established by means of a reference marker, with an estimated position derived from the stored predetermined path by means of travel distance measuring means such as an odometer, and may reset the position of the vehicle along the predetermined path accordingly.

The control means may check the integrity of the distance values to the curb sides provided by the sensors by comparing the sensed trackway width at an estimated position along the predetermined path with the stored trackway width, which may vary along the predetermined path. If the error between the sensed trackway width and the stored trackway width is within a given tolerance, then the sensor measurements are considered valid.

If the error is outside the given tolerance, then the control means may compare the sensed distances of each sensor with stored distances. If the error for a given sensor is within a given tolerance, then that sensor measurement is treated as valid. If not, then the measurement for that sensor is treated as invalid. Any invalid measurements identified may be ignored by the control means and the steering controlled on the basis of the valid measurements obtained and stored information.

An advantage of this feature is that anomalous sensor outputs, resulting for example from rubbish or other material accumulating on the trackway, are ignored, and the operation of the vehicle guidance system is unaffected.

One or more transponders, which may be passive transponders, may be positioned in the predetermined path, at locations stored by the control means. If the control means is unable to determine its actual position along the stored predetermined path, then the control means may control the vehicle to move at a reduced speed along the trackway. When a transponder is reached, a reader on the vehicle may receive an identifying signal from the transponder, from which the control means is able to identify the actual position of the vehicle along the predetermined path on the trackway.

This feature thus provides the further advantage that if a vehicle becomes temporarily lost, then by the use of the transponders provided at known positions, the control means is able to re-establish the position of the vehicle and resume travel at normal operating speed to the required destination.

A further control means may also be provided remote from the vehicle, which may be in wireless communication with the onboard control means of the vehicle. The remote control means may control or partially control the onboard control means, thereby enabling remote control of the vehicle. The further control means may be capable of over-riding the control of the onboard control means to start or stop the vehicle, for use, for example, in an emergency by a system operator who is overseeing the smooth running of a network of vehicles.

The invention will now be described, by way of example, with reference to the accompanying drawings, in which,

DETAILED DESCRIPTION OF THE INVENTION

Figure 1:
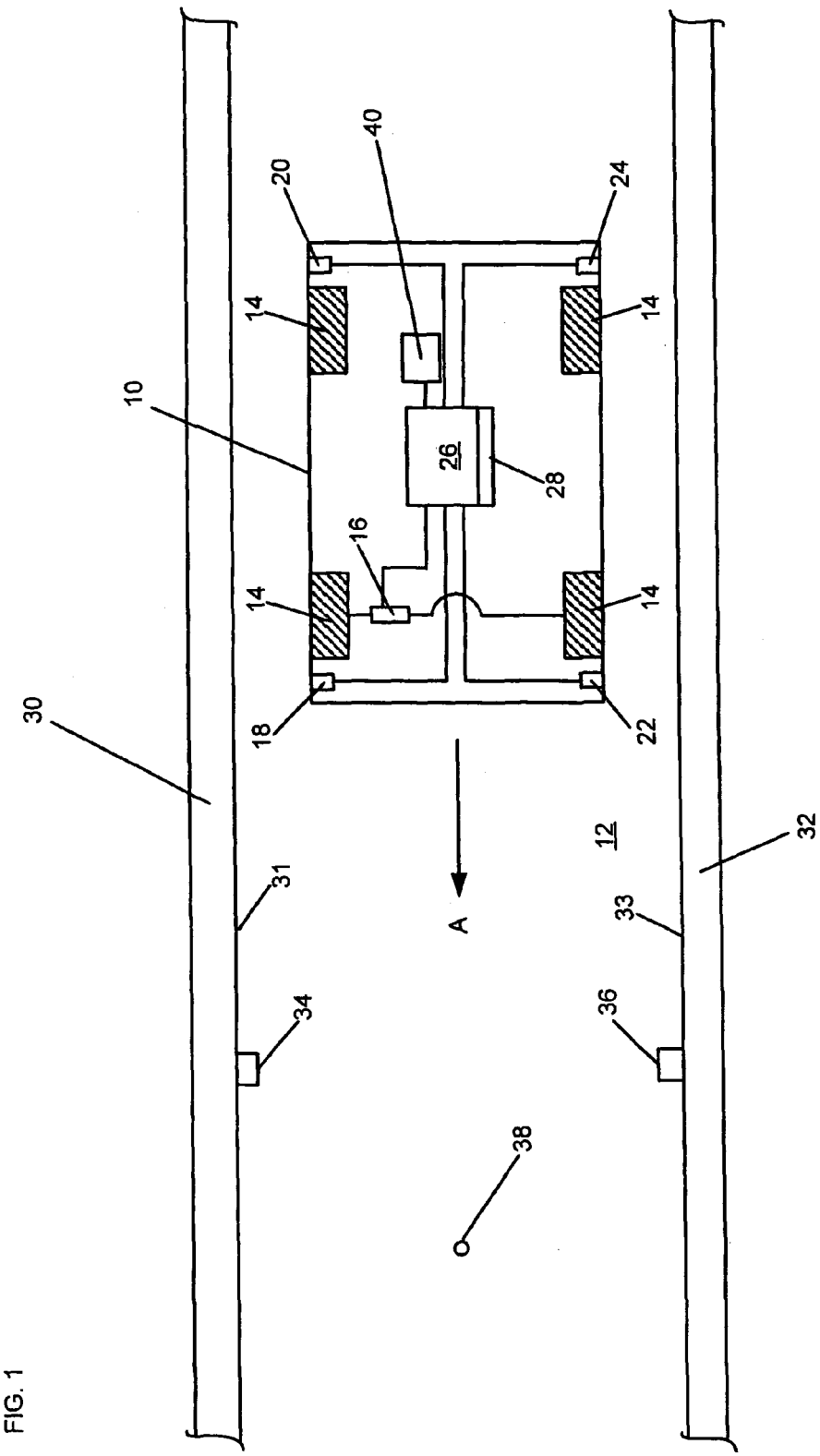
FIG. 1 shows a schematic plan view of a vehicle including a vehicle guidance system travelling on a trackway.

Referring to FIG. 1, an unmanned personal rapid transit (PRT) vehicle 10 is shown travelling along a trackway 12. Although only a short length of straight trackway is shown, this preferably forms part of a PRT network, comprising a plurality of vehicles and a plurality of stations connected by the trackway. The system may include junctions between trackway sections. Preferably, the stations are situated off the main trackway, so that vehicles of the system travel along the main trackway between the originating and destination stations for each journey, without needing to stop at intermediate stations.

The vehicle 10 has four wheels 14, two of which steer the vehicle, by means of a steering system, indicated at 16. One or more of the wheels 14 is driven, for example by an electric motor powered by an onboard power supply such as a battery. An ultrasonic distance sensor 18, 20, 22, 24 is positioned substantially at or close to each of the four corners of the vehicle 10. Two of the sensors 18, 20 are positioned on one side of the vehicle 10, and the other two sensors 22, 24 are positioned on the other side of the vehicle 10. The sensors on each side of the vehicle 10 are spaced apart sufficiently to detect the angular position of the vehicle relative to a substantially straight reference surface. The further the sensors 18, 20 and 22, 24 are apart, the more accurate the determination of the angular position of the vehicle 10 relative to the reference surface.

In other arrangements, the distance sensors may be lasers or any other suitable sensors for sensing distance. The sensors 18, 20, 22, 24 are directed laterally to the direction of travel of the vehicle, which is indicated by the arrow A. A control means in the form of an onboard computer 26, including a memory 28, is connected to receive signals from each of the sensors 18, 20, 22, 24 and controls the steering system 16.

The trackway 12 is bounded by curbs 30, 32 running along either side of the trackway, the inner surfaces of which provide reference surfaces 31, 33. The distance to the reference surfaces 31, 33 can be measured by the sensors 18, 20, 22, 24. The curbs 30, 32 are substantially continuous, but are interrupted at junctions to enable a vehicle 10 to leave or join the trackway 12. Reference markers 34, 36 in the form of protuberances (as shown) or undercuts (not shown) positioned in the sides of the curbs 30, 32 are positioned at known intervals along the trackway 12. The reference markers 34, 36 are shown on both sides of the trackway 12, although it is sufficient for one reference marker to be positioned on one side only of the trackway 12. The sensors 18, 20, 22, 24 are capable of detecting when a reference marker 34, 36 has been reached, because there is a change in the sensed distance between each sensor and the reference surface, as the sensor moves past the reference marker.

Passive transponders, one of which is shown at 38, are laid under the trackway at known positions along the trackway, and a reader 40, capable of transmitting a signal to illuminate a transponder 38 and to receive and read a modulated signal reflected from the transponder 38, is mounted in the vehicle 10. The reader 40 is connected to the computer 26.

In use, a predetermined path of travel along a trackway 12 for a given vehicle 10 is stored in the memory 28 of the onboard computer 26. The predetermined path can be obtained from the original track design parameters, or by manually steering a vehicle along the trackway 12 in a desired path whilst sensing the path followed and recording the distance traveled. In generating the predetermined path, reference sensor readings for the sensors 18, 20, 22, 24 are stored, corresponding to different positions along the path. Also, the road width at different positions along the path is determined and stored.

An input device, for example a touch screen, or keypad is provided inside or outside the vehicle, to enable a passenger to choose a travel destination. When the vehicle 10 is instructed to travel to a destination, the computer 26 controls the steering system 16 to follow the appropriate predetermined path or combination of predetermined paths to reach the destination. The sensors 18, 20, 22, 24 measure the distance, laterally of the vehicle travel direction A, between the sensors and the sides of the curbs 30, 32, which provide a reference surface along the predetermined path. The computer 26 controls the steering system 16 to correct any lateral deviation from the predetermined path as detected by the sensors 18, 20, 22, 24.

When the vehicle encounters a curve in the trackway, the computer 26 will control the steering system 16 to cause the vehicle to negotiate the curve. If the vehicle accurately follows the predetermined path, the output of the sensors 18, 20, 22, 24 will confirm this, and no corrective operation of the steering system 16 will be required. However, if the vehicle deviates from the predetermine path, the output of the sensors 18, 20, 22, 24 will detect this, and a corrective steering input will be generated.

The computer memory 28 can store a plurality of predetermined paths, any one of which can be selected. For example, paths into and out of each station in the network may be stored, as well as sections of the trackway between stations. A user departing from one station may select a desired destination, and the computer 26 will then load the paths required for that journey into an active memory.

The vehicle guidance system can be used in a vehicle for use in any travel network, by storing the predetermined paths specific to the desired network in the computer memory. If required, the trackway 12 can be super-elevated at bends, the super elevation being determined by the desired operating speed of the vehicles and the layout of junctions.

The sensors 18, 20, 22, 24 operate continuously, thus enabling the computer 26 to continuously correct for any lateral deviation from the predetermined path along the trackway 12. The difference or error between the actual position of the vehicle 10, as detected by the If the error is outside the given tolerance, then in step 50 the computer compares the sensed distances of each sensor with estimated distances, shown as step 52. The estimated sensor readings are computed by correcting the stored predetermined reference sensor readings for the estimated vehicle lateral and orientation error from the reference path. If the error for a given sensor is within a given tolerance, i.e., less than the tolerance, then that sensor measurement is valid, as shown at 56. If not, then the measurement for that sensor is treated as invalid. Any invalid measurements are ignored in step 58 by the computer 26 and the lateral position of the vehicle is established on the basis of the valid measurements.

If a sensor fails, or rubbish or other material accumulates on the trackway 12, then any erroneous sensor readings are ignored, and the operation of the vehicle guidance system is unaffected, by virtue of use of the algorithm 42.

Referring back to FIG. 1, if the computer 26 is unable to determine where along the stored predetermined path the vehicle is actually positioned on the trackway 12, then the computer may control the vehicle to move at a reduced speed along the trackway 12. When travelling "blind", the vehicle has no predetermined path to follow, and no the steering system 16 is controlled to keep the vehicle 10 positioned centrally between the curbs 30, 32 or at a minimum distance from the closest curb. When a transponder 38 is reached, the reader 40 identifies the modulated output from the transponder 38, and identifies the actual position of the vehicle 10 along the trackway 12. In other words, if a vehicle becomes temporarily lost, then by the use of the pre-positioned transponders 38, the computer 26 is able to re-establish the position of the vehicle 10 and to resume travel at normal operating speed to the required destination. Typically the maximum operating speed is 25 kilometers per hour.

If the system is used as part of a network, then a second computer (not shown) can be provided remote from the vehicle, which is in wireless communication with the onboard computer 26 of the vehicle 10. The remote computer can be arranged to control or partially control the onboard computer, thereby enabling remote control of the vehicle. The second computer can also be programmed to over-ride the control of the onboard computer 26, to start or stop the vehicle, for use, for example, in an emergency by a system operator who is overseeing the smooth running of a network of vehicles.

The second computer may also be used to set the route and schedule the movement of the vehicle so as to co-ordinate the operation of multiple vehicles.

The invention claimed is:

1. A vehicle guidance system for directing a vehicle having a steering system along a plurality of predetermined paths, the system comprising:
   an elevated structure which extends along the plurality of predetermined paths;
   a reference surface provided on the elevated structure and extending along the plurality of predetermined paths;
   an on-board vehicle controller comprising a memory for storing the plurality of predetermined paths; and
   a sensor which is adapted to measure the distance, laterally of the vehicle travel direction, between the sensor and the reference surface, the controller being adapted to control the steering system of the vehicle to correct any lateral deviation of the vehicle from a chosen predetermined path selected from the plurality of predetermined paths stored in the memory in response to an output from the sensor.

2. A vehicle guidance system as claimed in claim 1, in which the sensor is one of a plurality of sensors which are adapted to measure the distance directed laterally of the vehicle travel direction.

3. A vehicle guidance system as claimed in claim 1, in which the or each sensor is a non-contact sensor.

4. A vehicle guidance system as claimed in claim 1, in which the reference surface is provided by a curb or curbs.

5. A vehicle guidance system as claimed in claim 1, in which at least one reference marker is provided at a known position in the predetermined path, the or each reference marker being identifiable by the or each sensor.

6. A vehicle guidance system as claimed in claim 1, in which at least one transponder is disposed in a known position along the predetermined path.

7. A vehicle guidance system as claimed in claim 6, in which the or each transponder is passive.

8. A vehicle guidance system as claimed in claim 6, in which a reader is provided for identifying the position of the or each transponder.

9. A vehicle guidance system as claimed in claim 1, in which a second controller is provided, remote from the vehicle, and in aerial communication with the first controller, the second controller being adapted to over-ride or partially over-ride the input to the first controller.

10. A personal rapid transport system comprising:
    a trackway comprising a plurality of predetermined paths;
    elevated structures extending along each side of the trackway;
    a vehicle for travelling along the trackway, the vehicle having a steering system;
    reference surfaces provided on the elevated structures and extending along the plurality of predetermined paths;
    an on-board vehicle controller comprising a memory for storing the plurality of predetermined paths; and
    a sensor which is adapted to measure the distance, laterally of the vehicle travel direction, between the sensor and the reference surface, the controller being adapted to control the steering system of the vehicle to correct any lateral deviation of the vehicle from a chosen predetermined path selected from the plurality of predetermined paths stored in the memory in response to an output from the sensor.

11. A vehicle comprising:
    a steering system;
    an on-board vehicle controller comprising a memory for storing a plurality of predetermined paths; and
    a sensor which is adapted to measure the distance, laterally of the vehicle travel direction, between the sensor and a reference surface provided on an elevated structure and extending along the predetermined path,
    wherein the controller is adapted to control the steering system of the vehicle to correct any lateral deviation of the vehicle from a chosen predetermined path selected from the plurality of predetermined paths stored in the memory in response to an output from the sensor.

12. A vehicle as claimed in claim 11, in which the sensor is one of a plurality of sensors provided respectively substantially at or near each outer corner of the vehicle.

13. A method of guiding a vehicle along a predetermined path along which extends an elevated structure having a reference surface, comprising the steps of:
(a) selecting one of a plurality of predetermined paths stored in a memory of an on-board vehicle controller of the vehicle;
(b) sensing a distance laterally of the vehicle between the vehicle and the reference surface,
(c) comparing the sensed distance with a stored distance value, and
(d) controlling a steering system of the vehicle to correct any lateral deviation of the vehicle from the chosen predetermined path in response to an output from the sensor.

14. A method as claimed in claim 13, in which step (b) includes sensing a plurality of distances simultaneously, and in which the method further comprises:
(e) calculating a trackway width from two sensed distances including one from each side of the vehicle, and
(f) comparing the trackway width calculated from the sensed distances with a stored trackway width in order to verify that the sensor distance measurements are within a first tolerance.

15. A method as claimed in claim 14, in which sensed distances from each sensor are individually compared with stored estimated measurements in order to verify that the sensor distance measurements are within a second tolerance.

\* \* \* \* \*

UNITED STATES PATENT AND TRADEMARK OFFICE
CERTIFICATE OF CORRECTION

PATENT NO. : 8,433,467 B2
APPLICATION NO. : 12/596590
DATED : April 30, 2013
INVENTOR(S) : Torquil Ross-Martin It is certified that error appears in the above-identified patent and that said Letters Patent is hereby corrected as shown below:

In the Specification:

At column 5, line number 11, after "the vehicle 10, as detected by the" please insert the following:
--sensors 18, 20, 22, 24, and the ideal position of the vehicle as determined by the predetermined path are used to correct both the lateral deviation of the vehicle 10 from the predetermined path and also the vehicle alignment with the predetermined path. Ideally the vehicle 10 travels centrally along the trackway 12, i.e., the predetermined path is spaced equidistantly between the curbs 30, 32.

When the sensors 18, 20, 22, 24 detect a reference marker 34, 36, the computer 26 compares the actual position of the vehicle 10 in the predetermined path with a calculated position based on the measured distance travelled along to the stored predetermined path. Any deviation, or error, in the position is corrected by the computer 26.

Figure 2:
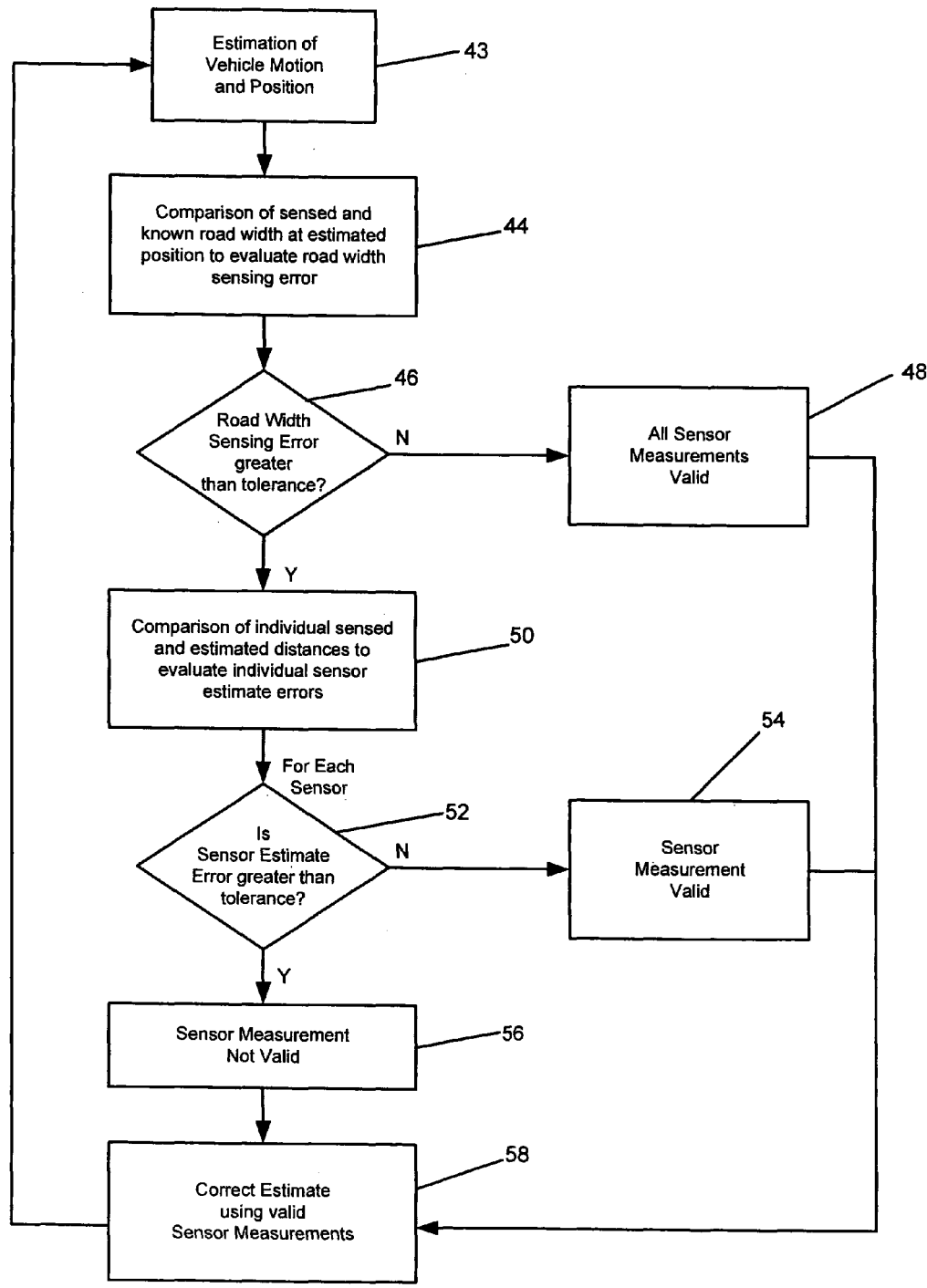
FIG. 2 shows an algorithm for checking the integrity of sensor readings.

Referring now to Fig 2, an algorithm 42 is shown, which the computer 26 runs to check the integrity of the distance values to the curbs 30, 32 provided by the sensors 18, 20, 22, 24. Firstly, in an operation indicated at 43, the computer 26 estimates the position of the vehicle 10 on the trackway 12, according to the predetermined path. Then in a step 44, the computer 26 compares the road width at the estimated position, as calculated from the outputs of the sensors 18, 20, 22, 24, with a road width stored in the computer memory 28, to calculate an error reading. If the error reading between the sensed road width and the stored road width is within a given tolerance, i.e., the road width error is not greater than the tolerance, as shown in step 46, then the sensor measurements for all of the sensors are considered valid, as shown at 48.--

Signed and Sealed this
Second Day of July, 2013

Teresa Stanek Rea
*Acting Director of the United States Patent and Trademark Office*